United States Patent Office 3,651,004
Patented Mar. 21, 1972

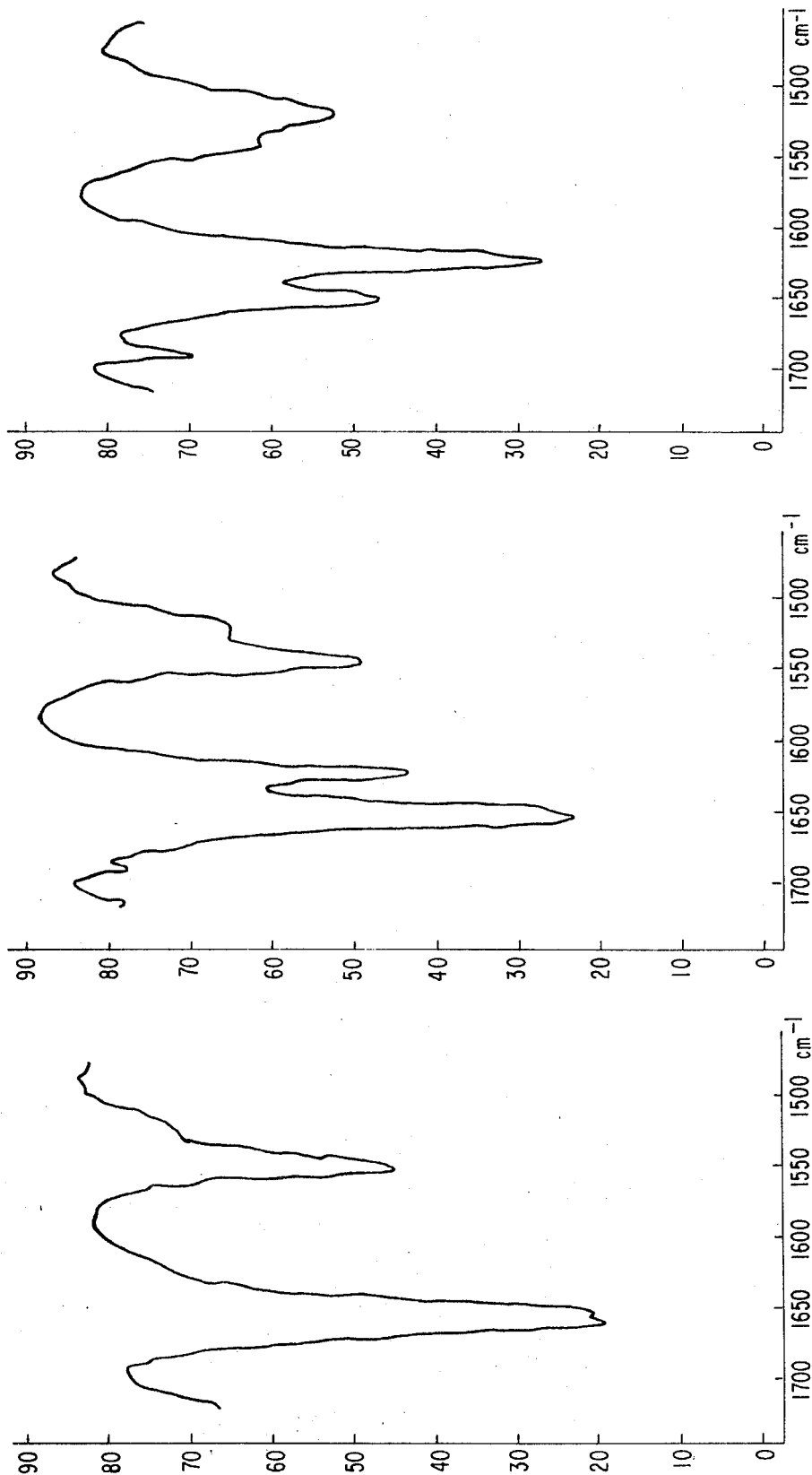

3,651,004
SOLUTIONS OF POLYGLUTAMIC ACID DERIVATIVES
Yasuo Fujimoto and Yoichi Koiwa, Tokyo, Japan, assignors to Kyowa Hakko Kogyo Co., Ltd., Tokyo, Japan
Filed May 6, 1970, Ser. No. 35,176
Claims priority, application Japan, May 7, 1969, 44/34,513
Int. Cl. C08g 51/36
U.S. Cl. 260—31.2 N                              7 Claims

ABSTRACT OF THE DISCLOSURE

Treating solid polymers of polyglutamic acid derivatives with formic acid effectively dissolves out the higher molecular weight portions thereof, resulting in solutions which are stable and which do not become discolored with time. Shaped articles such as films made from the formic acid solutions of, for example, poly-γ-alkyl glutamates or copolymers thereof possess superior mechanical properties such as tensile strength and elongation.

---

This invention relates to solutions of polyglutamic acid derivatives. More particularly, it relates to a method for obtaining solutions of polyglutamic acid derivatives containing almost no lower molecular weight portions. Even more particularly, the invention relates to solutions of polyglutamic acid derivatives in formic acid.

Heretofore, very highly polar acidic solvents such as dichloroacetic acid, trifluoroacetic acid, sulfuric acid and the like, have been used as solvents for dissolving solid polyglutamic acid derivatives. However, the solutions obtained in such solvents are very unstable. For example, in a dichloroacetic acid solution, poly-γ-methyl-L-glutamate having a molecular weight of about 300,000 is vigorously decomposed and the molecular weight is lowered to about 270,000 to 280,000 after standing for 24 hours even if the solution is stored in a dark place. Furthermore, solutions in trifluoroacetic acid and sulfuric acid show considerable coloring because of decomposition. Such solvents are corrosive to the vessels employed and are very harmful to the human body. In addition, they are so costly that they cannot be used practically on a commercial scale.

Accordingly, one of the objects of the present invention is to provide solutions of polyglutamic acid derivatives which overcome the disadvantages and deficiencies of the prior art.

Another object of the present invention is to provide a method for obtaining polyglutamic acid derivative solutions containing almost no lower molecular weight portions.

A further object of the invention is to provide solutions of polyglutamic acid derivatives which can be readily obtained economically and which therefore can be used on a commercial scale.

A still further object of the invention is to provide solutions of polyglutamic acid derivatives which are stable and which do not become discolored with time.

These and other objects and advantages of the present invention will become apparent to those skilled in the art from a consideration of the following specification and claims, taken in conjunction with the accompanying drawings.

FIGS. 1, 2 and 3 show infra-red absorption spectra of film before treatment with formic acid and of films prepared from the solutions obtained by formic acid treatment of said films for a predetermined period of time.

As a result of various studies of solvents capable of dissolving polyglutamic acid derivatives existent in the solid state, it has been found, in accordance with the present invention, that up to about 90% by weight of the polyglutamic acid derivatives are dissolved in formic acid by leaving the polyglutamic acid derivatives in the formic acid or by dipping the polymers in formic acid with stirring, whereby a solution of the polyglutamic acid derivative can be obtained. Surprisingly, it is found that the higher molecular weight portions of the solid polyglutamic acid derivatives are dissolved in the formic acid, whereas the portions of lower molecular weight are retained as residues without any dissolution. Since the formic acid dissolves only the portions having a high degree of polymerization, the polymer solution obtained by filtering off the portions retained as the residue contains almost no polyglutamic acid derivative of lower molecular weight. Accordingly, shaped articles obtained from the polymer solution of the invention, such as films, foils, threads, sheets, etc., by shaping, casting, molding or the like have considerably improved properties, as compared with those obtained directly from the conventional polymerization solutions.

Heretofore, it has been reported that the β-form portions are dissolved out by treating a film of poly-γ-benzyl-L-lutamate with formic acid (Journal of the American Chemical Society, vol. 78, p. 955 (1956)). However, the present inventors have found that the β-form portions are not dissolved out of the polymers when proceeding in accordance with the present invention.

Although the present invention is not to be limited by the veracity of any theoretical explanation therefor, the present inventors have studied the incomprehensible phenomenon that the portions of higher molecular weight are selectively dissolved in the formic acid solution of the invention and propose the following hypothesis. It is assumed that polyglutamic acid derivatives of higher molecular weight take an α-helix form having hydrogen bonds within the molecule in the polymeric solid as the secondary structure of the molecule and that polyglutamic acid derivatives of lower molecular weight take the β-form having intermolecular hydrogen bonds, and as a result the molecules of lower molecular weights having a β-form structure take a reticular tertiary structure and, consequently, are insoluble in formic acid. This fact has been confirmed from the amide-I-band and amide-II-band of the infra-red absorption spectrum.

FIG. 1 shows an infra-red absorption spectrum of a non-treated film made directly from a polymerization solution of poly-γ-methyl-L-glutamate (PMG). FIG. 2 shows the infra-red absorption spectrum of a residual film obtained by treating the non-treated film of PMG with formic acid when 50 wt. percent of the initial PMG film was dissolved, and FIG. 3 shows the IR spectrum of a residual film when 88 wt. percent of the initial PMG was likewise dissolved by the same treatment. It is evident in view of the absorption of the amide-I-band, 1630 cm.$^{-1}$ specific absorption to the β-form), of the spectrum that the α-helix portions are dissolved into formic acid and molecular chains having the β-form state are retained. The weight-average molecular weights of the PMG in the films of FIGS. 1, 2, and 3 are 260,000, 210,000 and 120,000, respectively.

It can be seen from this fact that the portions of higher molecular weight are dissolved in the formic acid and that the portions of lower molecular weight are not dissolved therein. Thus, shaped articles obtained from the formic acid solution of polyglutamic acid derivatives consisting only of polymers of higher molecular weight have considerably improved properties, as compared with those obtained directly from the conventional polymerization solutions. For example, no fluorescence or color development is observed in the film made by casting the formic acid solution of the polyglutamic acid derivative, as is observed in the non-treated film made by casting the polymerization solution as such. The film made from the formic acid solution of polymer has a uniform transparency and considerably strong mechanical strength. The thus-obtained shaped articles are of very good quality and can be used in making high quality shaped articles, such as artificial internal organs.

The polyglutamic acid derivatives employed in the present invention are either homopolymers or copolymers. The homopolymers are selected, for example, from the optically active or inactive poly-γ-alkyl glutamates, such as the γ-methyl-glutamate,
γ-ethyl-glutamate,
γ-(n-propyl)-glutamate,
γ-(i-propyl)-glutamate,
γ-(n-butyl)-glutamate,
γ-(i-butyl)-glutamate,
γ-(sec-butyl)-glutamate,
γ-(t-butyl)-glutamate,
γ-(n-hexyl)-glutamate,
γ-(n-octyl)-glutamate or
γ-(2-ethylhexyl)-glutamate, i.e., wherein the alkyl moiety preferably contains from 1 to 8 carbon atoms. Copolymers containing at least one kind of these glutamate moieties as a component can also be employed. As the other copolymerization monomer in the copolymer, one or more of said glutamates or optically active or inactive neutral amino acids, acidic amino acids, basic amino acids and their derivatives can be used. Exemplary of such amino acids are L- or D- or DL-alanine, glutamic acid-γ-ester, aspartic acid-β-ester, O-substituted serine, O-substituted threonine, O-substituted tyrosine, methionine, $N^\epsilon$-substituted lysine, $N^\epsilon$-substituted ornithine, valine, isoleucine, leucine, tryptophan, etc. When it is necessary to protect the functional groups of the amino acid, such as the carboxyl group, amino group, hydroxyl group, SH group, etc., the known organic residues of aliphatic, aromatic and alicyclic groups are used as the protecting group. The composition ratio of the copolymer does not need to be limited to any particular extent, but it is desirable that the copolymer contain at least 50% by weight of the glutamate component.

The following examples are given merely as illustrative of the present invention and are not to be considered as limiting. Unless otherwise noted, the percentages therein and throughout the application are by weight.

EXAMPLE 1

A 1,2-dichloroethane solution of 10% of poly-γ-glutamate, prepared in accordance with a conventional method, is coated onto a glass plate by means of a knife coating method and is then dried at room temperature to obtain films. The film is dipped in formic acid, and a small amount of insoluble portions is filtered off after one hour. A film is made from the filtrate by the knife coating method.

The mechanical strengths of both kinds of films are compared.

|  | Film made from the dichloroethane solution of poly-γ-methyl-L-glutamate | Film made from the formic acid solution of poly-γ-methyl-L-glutamate |
| --- | --- | --- |
| Tensile strength (kg./mm.$^2$) | 3.3 | 5.1 |
| Elongation (percent) | 89 | 122 |

EXAMPLE 2

A 1,2-dichloroethane solution of 8% by weight of copoly-(γ-methyl-L-glutamate and $N^\epsilon$-carbobenzoxy-L-lysine) (9:1), prepared according to the conventional method, is precipitated in methanol, and the precipitates are dried and then stirred in formic acid at 30° C. for 2 hours. After filtration, the solution is defoamed and extruded into a coagulation bath having a volume ratio of acetone:water of 1:1 at a linear speed of 15 meters per minute through a nozzle consisting of 26 holes having a diameter of 0.08 mm. and is passed through the coagulation bath at 13.6 meters per minute. After water-washing, the extrudate is stretched to 2.2 times in hot water, dried with hot air and wound up. The tensile strength of the dry fiber is 2.41 grams per denier and the elongation is 29%.

EXAMPLE 3

A 1,2-dichloroethane solution of 8% by weight of copoly-(γ-methyl-L-glutamate and γ-benzyl - L - glutamate) (9:1) is made into a film having a thickness of about 0.123 mm., and then the film is dipped into formic acid and stirred for about one hour. After filtration, the filtrate is coated onto a glass plate by the knife coating procedure, coagulated in a coagulation bath having a volume percent of acetone:methanol:water of 50:25:25, thoroughly washed with water and dried with air, resulting in a uniformly transparent film having a thickness of 0.113 mm. The tensile strength and the elongation of the untreated film are 2.8 kg./mm.$^2$ and 71%, respectively, whereas those of the film treated with formic acid are 4.2 kg./mm.$^2$ and 108.7%.

EXAMPLE 4

Comparison is made in the same manner as described in Example 3, using copoly-(γ-methyl-L-glutamate and L-alanine) (8:2). The tensile strength and the elongation of the original film are 2.6 kg./mm.$^2$ and 79%, respectively, whereas the tensile strength and the elongation of the film made from the formic acid solution are 3.9 kg./mm.$^2$ and 126%.

EXAMPLE 5

A formic acid solution is obtained by carrying out the procedure in the same manner as described in Example 3, using copoly-(γ-methyl-D-glutamate and γ-(t-butyl)-D-glutamate). The filtered solution is coated to a thickness of 1.5 mm. by a known procedure for making artificial leathers onto a nylon non-woven fabric coated with a polymethylol adduct of lysine diisocyanate methyl ester as an adhesive and is dried. A synthetic leather having a similar appearance and touch to those of natural leather is obtained.

The invention being thus described, it will be obvious that the same may be varied in many ways. Such variations are not to be regarded as a departure from the spirit and scope of the invention, and all such modifications as would be obvious to one skilled in the art are intended to be included herein.

What is claimed:

1. An organic solvent solution of a polyglutamic acid derivative comprising formic acid and a polymer selected from the group consisting of a homopolymer of a γ-lower alkyl glutamate and a copolymer of a γ-lower alkyl glutamate and a monomer copolymerizable therewith, said copolymer containing at least 50% by weight of the γ-lower alkyl glutamate.

2. A polymeric solution in accordance with claim 1, wherein said γ-lower alkyl glutamate has from 1 to 8 carbon atoms in said lower alkyl group.

3. A polymeric solution in accordance with claim 1, wherein said copolymerizable monomer is an amino acid.

4. A method of selectively dissolving higher molecule weight portions from a polymer selected from the group consisting of a homopolymer of a γ-lower alkyl glutamate and a copolymer of a γ-lower alkyl glutamate and a monomer copolymerizable therewith, said copolymer containing at least 50% by weight of the γ-lower alkyl glutamate which comprises contacting a solid form of said polymer with formic acid so as to dissolve the polymer therein and filtering off the residue, whereby an organic solvent solution of said polymer of high molecular weight is obtained.

5. The method of claim 4, wherein said γ-lower alkyl glutamate has from 1 to 8 carbon atoms in said lower alkyl group.

6. The method of claim 4, wherein said polymer is in the form of a shaped article.

7. The method of claim 6, wherein said shaped article is a film.

References Cited

UNITED STATES PATENTS

| | | | |
|---|---|---|---|
| 3,089,749 | 5/1963 | Ballard | 260—78 AX |
| 3,076,790 | 2/1963 | Fox | 260—78A |
| 2,540,855 | 2/1951 | Tullock | 260—31.2 N |

OTHER REFERENCES

Blout: The Infrared Spectra of Polypeptides Derived From Benzyl-L-Glutamate: "Journal of the American Chem. Soc."; vol. 78; 1956; p. 955.

Stille: Introduction to Polymer Chemistry; John Wiley & Sons, Inc.; 1962; p. 61; Sci. Lib.

LEWIS T. JACOBS, Primary Examiner